United States Patent
Ikuse et al.

(10) Patent No.: US 10,412,101 B2
(45) Date of Patent: Sep. 10, 2019

(54) DETECTION DEVICE, DETECTION METHOD, AND DETECTION PROGRAM

(71) Applicant: NIPPON TELEGRAPH AND TELEPHONE CORPORATION, Chiyoda-ku (JP)

(72) Inventors: Tomonori Ikuse, Musashino (JP); Kazufumi Aoki, Musashino (JP); Takeo Hariu, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 15/320,186

(22) PCT Filed: Jun. 24, 2015

(86) PCT No.: PCT/JP2015/068269
§ 371 (c)(1),
(2) Date: Dec. 19, 2016

(87) PCT Pub. No.: WO2016/002605
PCT Pub. Date: Jan. 7, 2016

(65) Prior Publication Data
US 2017/0126715 A1    May 4, 2017

(30) Foreign Application Priority Data
Jun. 30, 2014 (JP) .................. 2014-134055

(51) Int. Cl.
*H04L 29/06* (2006.01)
*G06F 21/64* (2013.01)
(Continued)

(52) U.S. Cl.
CPC ........ *H04L 63/1416* (2013.01); *G06F 21/566* (2013.01); *G06F 21/64* (2013.01); *G06Q 40/02* (2013.01); *H04L 2463/144* (2013.01)

(58) Field of Classification Search
CPC ............................ H04L 63/1416; G06S 40/02
See application file for complete search history.

(56) References Cited

U.S. PATENT DOCUMENTS 9,225,730 B1 * 12/2015 Brezinski ................ G06F 21/00
2008/0028463 A1    1/2008 Dagon et al.
(Continued)

FOREIGN PATENT DOCUMENTS

CN    102428476 A    4/2012
CN    102855568 A    1/2013
(Continued)

OTHER PUBLICATIONS

Lee Hee Jo et al., "Method and apparatus for detecting Bot Process," KR20120057059, KR Machine Translation.*
(Continued)

*Primary Examiner* — Luu T Pham
*Assistant Examiner* — Canh Le
(74) *Attorney, Agent, or Firm* — Oblon, McClelland, Maier & Neustadt, L.L.P.

(57) ABSTRACT

A detection device includes a data-propagation tracking unit that gives communication data a tag including attribute information associated with communication destination information of the communication data and tracks propagation of communication data on which the tag including the attribute information is given, and a falsification detection unit that detects falsification on the communication data when, in the communication data, there is a tag including attribute information different from attribute information
(Continued)

corresponding to a transmission destination or a transmission source of the communication data.

5 Claims, 6 Drawing Sheets

(51) Int. Cl.
*G06Q 40/02* (2012.01)
*G06F 21/56* (2013.01)

(56) References Cited

U.S. PATENT DOCUMENTS

| | | | |
|---|---|---|---|
| 2011/0302656 A1 | 12/2011 | El-Moussa | |
| 2012/0240236 A1* | 9/2012 | Wyatt | G06F 21/564 |
| | | | 726/25 |
| 2013/0055386 A1* | 2/2013 | Kim | G06F 21/645 |
| | | | 726/22 |
| 2014/0245436 A1 | 8/2014 | Dagon et al. | |
| 2015/0271196 A1* | 9/2015 | Hay | H04L 63/1433 |
| | | | 726/25 |
| 2016/0156660 A1 | 6/2016 | Dagon et al. | |

FOREIGN PATENT DOCUMENTS

| | | |
|---|---|---|
| CN | 103595590 A | 2/2014 |
| EP | 2 222 048 A1 | 8/2010 |
| JP | 6-197133 A | 7/1994 |
| JP | 2006-128989 A | 5/2006 |
| JP | 2010-272984 A | 12/2010 |
| JP | 2013-98719 A | 5/2013 |
| KR | 10-2012-0057059 | 6/2012 |
| WO | WO 2007/050244 A2 | 5/2007 |
| WO | WO 2007/050244 A3 | 5/2007 |

OTHER PUBLICATIONS

Xiaowe Li et al., "Automated Black-box Detection of Access Control Vulnerabilities in Web Applications," 2014 ACM, pp. 49-60. (Year: 2014).*

Hikaru Kishimoto et al., "Secure Consolidation of Charging Information over Smart Grid using ID Federation," 2014 by IEICE, pp. 226-230. (Year: 2014).*

Extended Search Report dated Oct. 26, 2017 in European Patent Application No. 15814747.0.

Elizabeth Stinson, et al., "Characterizing Bots' Remote Control Behavior", Detection of Intrusions and Malware, and Vulnerability Assessment, Lecture notes in computer science, XP19096947, pp. 89-108.

T. Ikuse, et al., "Identifying C&C Server by Analyzing Relation between Control Flow and Communications," IEICE Technical Report, Mar. 20, 2014, vol. 113, No. 502, 32 pages (with English translation).

P. Wurzinger, et al., "Automatically Generating Models for Botnet Detection," Proceedings of the 14th European Conference on Research in Computer Security, 17 pages, 2009.

T. Segawa, et al., "A Safe Sandbox Analysis Method for Malware that Attempt Man-in-the-Browser Attacks," IPSJ SIG Technical Report, 8 pages, 2012 (with English Abstract).

International Search Report dated Sep. 1, 2015 in PCT/JP2015/068269 filed Jun. 24, 2015.

Office Action dated Jan. 4, 2017 in Japanese Patent Application No. 2016-531302 with English translation.

Decision to Grant a Patent dated Feb. 14, 2017 in Japanese Patent Application No. 2016-531302 with English translation.

Office Action dated Oct. 31, 2018 in Chinese Application No. 201580033556.3 (w/English machine translation).

Office Action dated May 27, 2019 in Chinese Application No. 201580033556.3 (w/English translation).

* cited by examiner

| ATTRIBUTE INFORMATION | TRANSMISSION AND RECEPTION INFORMATION (R: RECEPTION, S: TRANSMISSION) | COMMUNICATION DESTINATION INFORMATION |
|---|---|---|
| 0x1 | R | 192.168.0.1 |
| 0x2 | S | 192.168.0.5 |
| 0x3 | S | 192.168.0.1 |
| ⋮ | ⋮ | ⋮ |
| 0xA | R | 192.168.1.10 |
| ⋮ | ⋮ | ⋮ |

DETECTION DEVICE, DETECTION METHOD, AND DETECTION PROGRAM

FIELD

The present invention relates to a detection device, a detection method, and a detection program.

BACKGROUND

In recent years, there are many damages caused by online banking frauds using malware, which has an MITB (Man-in-the-browser) attack function. An MITB attack is an attack of intercepting communication between a terminal user and a Web server to steal and falsify the communication contents. Malware such as ZBot and SpyEye has an MITB attack function and, by intercepting communication between an infected terminal and an online bank to falsify communication data, conducts attacks such as manipulation of the amount of remittance and display of a fake input form.

Malware such as ZBot employs a system in which communication data to be targeted by the MITB attack can be specified by a setting file. Therefore, the target of the MITB attack is not limited to online banking, and the attacker can conduct an attack on communication data between an infected terminal and a targeted Web server. The setting file is provided on a C&C (Command and Control) server, and malware recognizes the target of a falsifying attack and the falsification contents by communicating with the C&C server and acquiring the file. Thereafter, in the case of malware such as ZBot, a falsifying attack is conducted by using API (Application Programming Interface) hooking. For example, by hooking an API related to transmission and reception of communication data, a falsifying attack on communication data before encrypting or after decoding is conducted. When an API is under such attack, it is not possible to block such falsifying attack only by protecting its communication path with an SSL.

When countermeasures against such threats are to be taken, it is ideal to prevent malware infection itself. However, the methods for conducting infectious attacks are more sophisticated year by year, and it has been difficult to prevent such infection beforehand. Therefore, it is essential to take countermeasures against such threats on an assumption that user terminals will be infected with malware.

There are mainly two methods for taking countermeasures on a client side after being infected with malware. One of the methods is a method for protecting a process as an attacking target so as to prevent API hooking and the like from being conducted, and the other one is a method for blocking acquisition of a setting file that specifies a falsifying target and contents. If API hooking can be prevented from being conducted, occurrence of falsification can be prevented beforehand. However, securely realizing this prevention in a malware-infected state is difficult. Meanwhile, in the case of the method for blocking acquisition of a setting file, because countermeasures can be taken on a network, even if a terminal is infected with malware, these countermeasures can be taken. However, in this case, the IP (Internet Protocol) address and the like of a C&C server that distributes the setting file need to be acknowledged beforehand.

Generally, malware analysis is performed to collect an IP address and the like of a C&C server beforehand. As a method for automatically specifying a C&C server with malware analysis, a method for specifying a C&C server based on a passing relation of communication data between system calls has been proposed in Non Patent Literature 1. This method focuses on a passing relation of data between system calls appearing only when malware communicates with a C&C server, and has a characteristic that the number of times of erroneous detection is small. However, when there is no apparent characteristic of a passing relation of data between system calls, any detection cannot be performed.

Furthermore, as an analysis method of malware that conducts an MITB attack, there has been proposed another method in Non Patent Literature 2. The method in Non Patent Literature 2 is advantageous in characteristics such that malware is analyzed without causing influences on a Web server, and detection of falsification and specification of a falsified location can be performed. However, this method does not realize specification of a C&C server that has specified falsification contents.

CITATION LIST

Non Patent Literatures

Non Patent Literature 1: P. Wurzinger, L. Bilge, T. Holz, J. Goebel, C. Kruegel, and E. Kirda, "Automatically Generating Models for Botnet Detection", In Proceedings of the 14th European Conference on Research in Computer Security Non Patent Literature 2: SEGAWA TATSUYA, KAMIZONO MASAKI, HOSHIZAWA YUJI, YOSHIOKA KATSUNARI, MATSUMOTO TSUTOMU, "A Safe Sandbox Analysis Method for Malware that Attempt Man-in-the-Browser Attacks", The IEICE Technical Report

SUMMARY

Technical Problem

An object of the present invention is to provide a detection device, a detection method, and a detection program that can specifically analyze falsification on communication data.

Solution to Problem

A detection device includes: a tracking unit that gives communication data a tag including attribute information associated with communication destination information of the communication data and tracks propagation of communication data on which the tag is given; and a detection unit that detects falsification on the communication data when, in the communication data, there is a tag including attribute information different from attribute information corresponding to a transmission destination or a transmission source of the communication data.

Advantageous Effects of Invention

According to the embodiments disclosed in the present application, falsification on communication data can be specifically analyzed.

DESCRIPTION OF EMBODIMENTS

Embodiments of a detection device, a detection method, and a detection program according to the present application will be explained below in detail with reference to the accompanying drawings. The detection device, the detection method, and the detection program according to the present application are not limited to the embodiments.

Embodiment

In the following embodiment, configurations and process flows of a detection device according to the embodiment are described in this order, and then effects of the embodiment are described in the end.
[Configuration of Detection Device]

Figure 1:
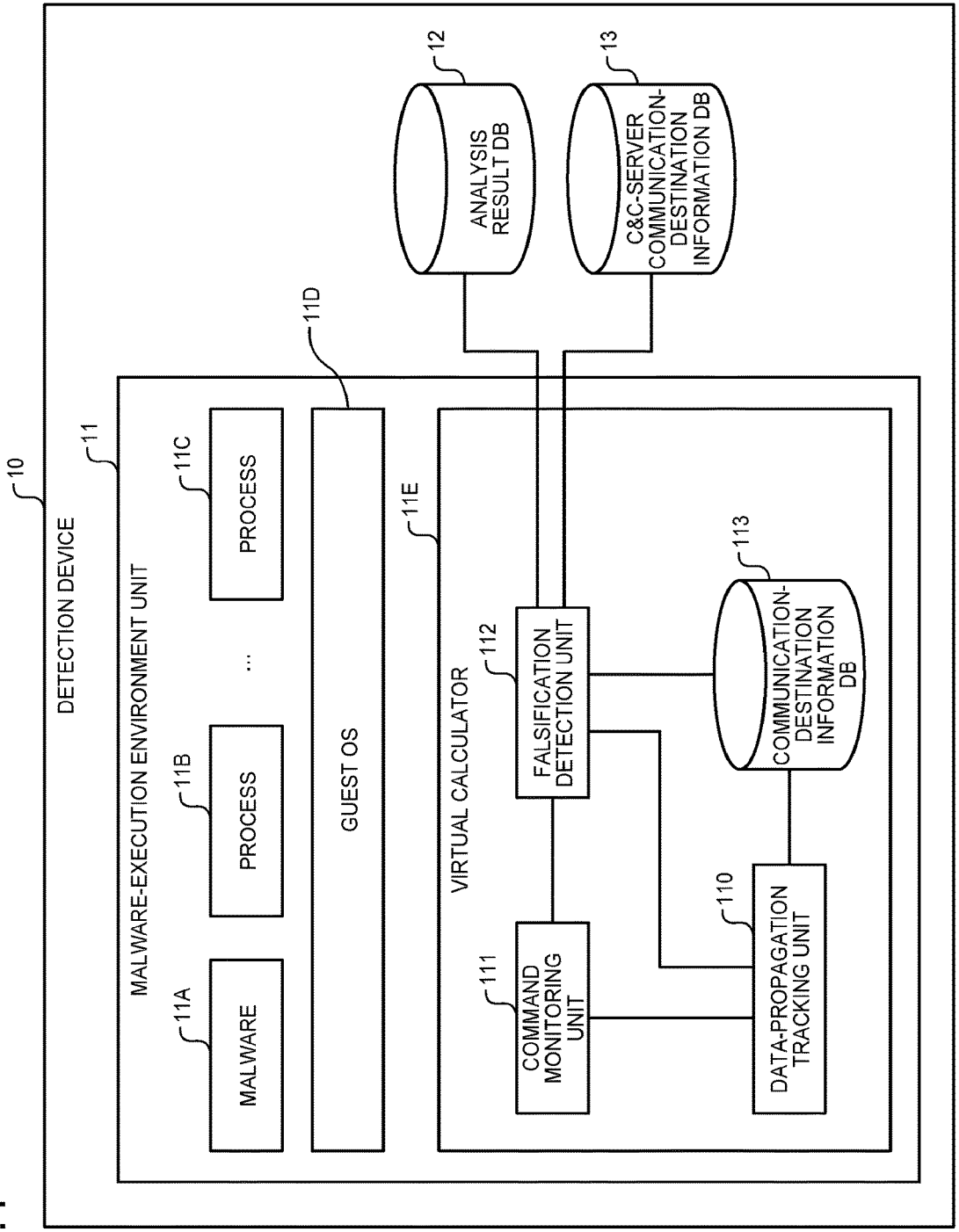
FIG. 1 is a configuration diagram illustrating an outline of a detection device according to an embodiment of the present invention.

First, with reference to FIG. 1, a configuration of a detection device 10 is described. FIG. 1 is a configuration diagram illustrating an outline of the detection device according to the present embodiment. As illustrated in FIG. 1, the detection device 10 includes a malware-execution environment unit 11, an analysis result DB (Data Base) 12, and a C&C-server communication-destination information DB 13. Processes of these constituent elements are described below.

The malware-execution environment unit 11 is constituted by processes 11B and 11C, a guest OS (Operating System) 11D, and a virtual calculator 11E. The guest OS 11D is an environment for dynamically analyzing malware 11A. The malware 11A is executed on the guest OS 11D and, on the guest OS 11D, the malware 11A operates the processes 11B and 11C, such as a browser, that are attacking targets of the malware 11A.

The virtual calculator 11E is constituted by a data-propagation tracking unit 110, a command monitoring unit 111, a falsification detection unit 112, and a communication-destination information DB 113.

The data-propagation tracking unit 110 gives a tag to communication data and tracks propagation of the communication data. At this time, in order to uniquely specify the transmission destination or the transmission source of the communication data, the tag is caused to hold attribute information and the like that corresponds to communication destination information. In the following descriptions, when the transmission destination and the transmission source are generally referred to, these are described as "communication destination". Further, the communication destination information is, for example, information such as an IP address, an FQDN (Fully Qualified Domain Name), or a URL (Uniform Resource Locator) of the communication destination.

Figures 3, 4:
FIG. 3 is a diagram illustrating a configuration example of a tag according to the embodiment.
FIG. 4 is a diagram illustrating an example of information stored in a communication-destination information DB according to the embodiment.

With reference to FIG. 3, a configuration example of a tag is described here. FIG. 3 is a diagram illustrating a configuration example of a tag according to the present embodiment. As illustrated in FIG. 3, a tag includes an "ID (identification)" and "attribute information". In this example, the attribute information is information corresponding to communication destination information of the transmission source or the transmission destination of communication data. The ID is information that is set to be a value (a serial number) continuous to each piece of corresponding attribute information. That is, the tag can be uniquely identifiable by the combination of the attribute information and the ID. Note that the tag is, for example, given in the unit of a predetermined data length with respect to certain communication data.

As an example, there is described a case where a tag is given to 10-byte reception data received from a communication destination of an IP address "192.168.0.1". In this example, there is described a case where a tag is given in the unit of 1-byte, and attribute information corresponding to the IP address "192.168.0.1" is "0x1". In this case, because a tag is given to 10-byte reception data in the unit of 1-byte, ten tags are given to the reception data. Among these tags, a first tag includes an ID "1" and attribute information "0x1", a second tag includes an ID "2" and attribute information "0x1", a third tag includes an ID "3" and attribute information "0x1", and so on, and a tenth tag includes an ID "10" and attribute information "0x1". In this manner, each of the tags includes an ID given as a serial number and attribute information corresponding to the communication destination. When data is received again from the communication destination of the IP address "192.168.0.1", a plurality of tags, each of which includes an ID of a serial number beginning with an ID "11", are given to the reception data. Further, when data is received from a communication destination of an IP address such as "192.168.0.2", which is different from the above address, a plurality of tags, each of which includes an ID of a serial number beginning with an ID "1", are given to the reception data.

As described above, the tags according to the present embodiment are given in plural to communication data in the unit of a predetermined data length and respective IDs of the plurality of tags are allocated as serial numbers, because, due to this configuration, it becomes possible to specify falsification contents of the communication data. For example, when IDs are allocated as serial numbers, the ID values included in the respective tags are continuous along the sorting order of the tags. When the ID values included in the respective tags are not continuous along the sorting order of the tags, the falsification detection unit 112 can detect falsification on the communication data and can specify a fact that data around the portion of discontinuous ID values has been falsified. Further, for example, when there is a missing ID number or when other tags are mixed in the data, the falsification detection unit 112 can specify a fact that rewriting or reediting of the communication data has been made. In addition, when there is a misalignment in the ID numbers, the falsification detection unit 112 can specify a fact that data around the misaligned portion has been deleted.

That is, the data-propagation tracking unit 110 sets a tag on communication data, transfers attribute information included in the set tag and communication destination information corresponding to the attribute information to the communication-destination information DB 113, and tracks propagation of the communication data on the virtual calculator 11E. The communication-destination information DB 113 associates the attribute information and the communication destination information transferred from the data-propagation tracking unit 110 to each other, and stores therein the associated pieces of information. The information stored in the communication-destination information DB 113 is described later.

The command monitoring unit 111 monitors commands issued in a system. For example, the command monitoring unit 111 monitors commands for calling an API (Application Programming Interface) having been executed by the malware 11A and for issuing system calls.

In communication data, if there is a tag including attribute information that is different from attribute information corresponding to the transmission destination or the transmission source of the communication data, the falsification detection unit 112 detects falsification on the communication data. For example, the falsification detection unit 112 detects falsification based on a tag set in the communication data. Subsequently, when falsification is detected, the falsification detection unit 112 specifies data, which corresponds to a tag including attribute information that is different from attribute information corresponding to the transmission destination or the transmission source of the communication data, as falsification contents, and transfers the specified falsification contents to the analysis result DB 12. The analysis result DB 12 stores therein analysis results such as the falsification contents transferred from the falsification detection unit 112.

Furthermore, when falsification is detected, the falsification detection unit 112 specifies a communication destination, which is linked to a tag including attribute information that is different from attribute information corresponding to the transmission destination or the transmission source of the communication data, as a C&C server. Subsequently, the falsification detection unit 112 transfers the specified communication destination information as the communication destination information of the C&C server to the C&C-server communication-destination information DB 13. The C&C-server communication-destination information DB 13 stores therein the communication destination information of the C&C server transferred from the falsification detection unit 112.

Figure 2:
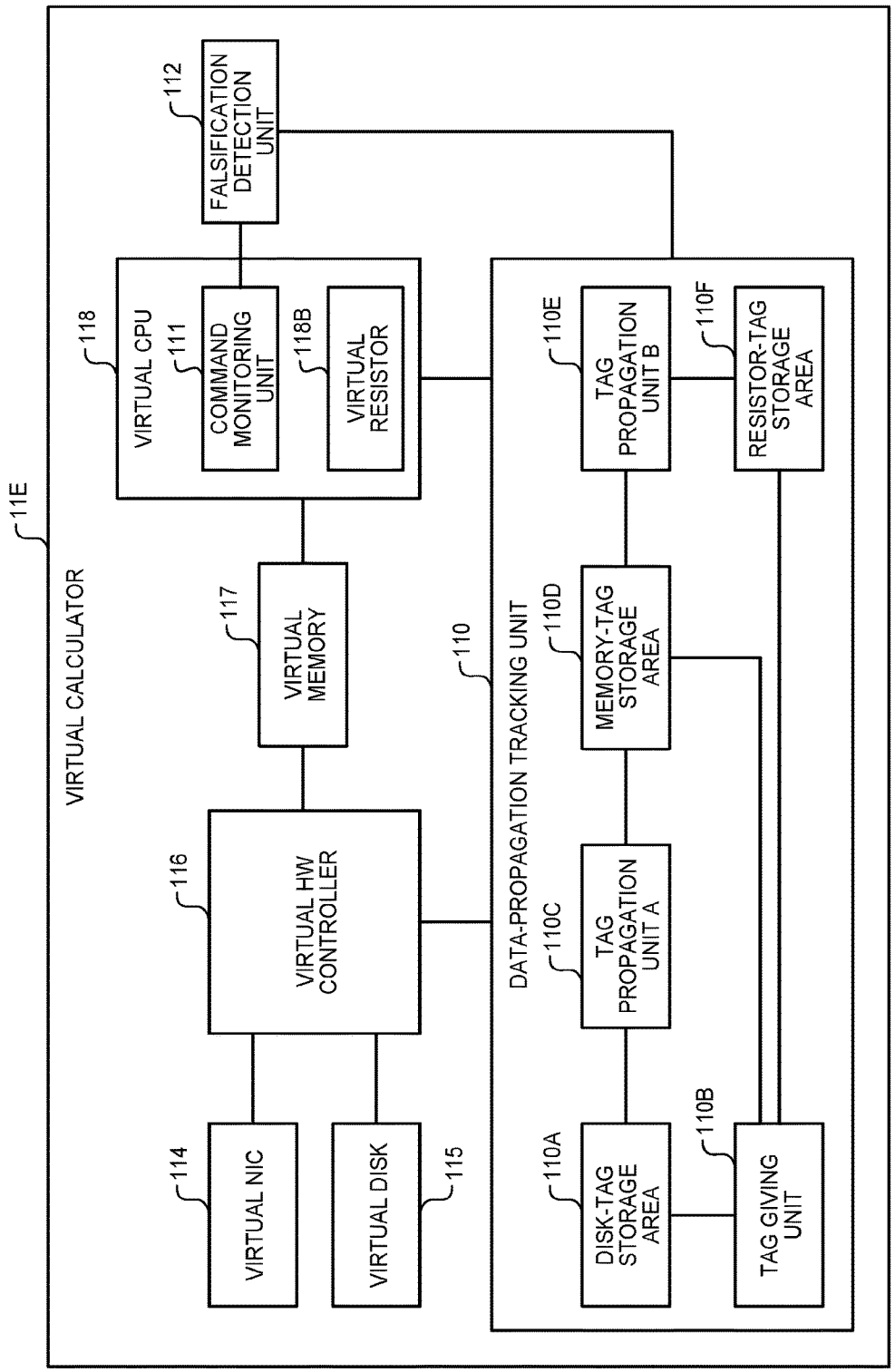
FIG. 2 is a block diagram illustrating a configuration of a virtual calculator and that of a data-propagation tracking unit in the detection device according to the embodiment.

Next, with reference to FIG. 2, a configuration example of the virtual calculator 11E is described. FIG. 2 is a block diagram illustrating a configuration of a virtual calculator and that of a data-propagation tracking unit in the detection device according to the present embodiment. The virtual calculator 11E is software providing virtual hardware to the guest OS 11D. The virtual calculator 11E is constituted by a virtual NIC (Network Interface Card) 114, a virtual disk 115, a virtual HW controller 116, a virtual memory 117, a virtual CPU 118, and the like.

In order to track propagation of data by setting a tag on the data, the data-propagation tracking unit 110 includes a disk-tag storage area 110A for storing a tag corresponding to data on the virtual disk 115, a memory-tag storage area 110D for storing a tag corresponding to data on the virtual memory 117, and a resistor-tag storage area 110F for storing a tag corresponding to data on a virtual resistor 118B.

A tag giving unit 110B of the data-propagation tracking unit 110 sets a tag that can uniquely specify a transmission source on communication data, transfers the set tag to the communication-destination information DB 113, and stores the tag in the memory-tag storage area 110D. When the communication data is reception data, the timing of setting the tag is a timing when the data is copied from the virtual NIC 114 to the virtual memory 117, or a timing right after an API or a system call receiving the data is called (that is, a timing returning from a function to a calling source). When the communication data is transmission data, the timing of setting the tag is a timing of calling an API or of issuing a system call in order for a legitimate application such as a browser to transmit the data. The tag set in the data is propagated by a tag propagation unit 110C (a tag propagation unit A) along with propagation of the data.

The tag propagation unit 110C performs propagation of tags between the disk-tag storage area 110A and the memory-tag storage area 110D. A tag propagation unit 110E (a tag propagation unit B) performs propagation of tags between the memory-tag storage area 110D and the resistor-tag storage area 110F or between resistor-tag storage areas 110F.

The command monitoring unit 111 monitors API calling executed by a legitimate application such as a browser. When the legitimate application has called an API related to data reception, at the time of the calling, the command monitoring unit 111 records all arguments of a function, and notifies the arguments to the falsification detection unit 112 at the time of returning. When the API is related to data transmission, the command monitoring unit 111 notifies the arguments to the data-propagation tracking unit 110 at the time of calling. The data-propagation tracking unit 110 having received the notification sets a tag that can uniquely specify the transmission destination of data on the transmission data at the tag giving unit 110B. The API related to data reception or data transmission is set by a malware analyst or the like before performing analysis.

After receiving a notification from the command monitoring unit 111, by checking a tag corresponding to reception data, the falsification detection unit 112 detects falsification to the reception data, specifies falsification contents, and specifies a C&C server having specified the falsification contents. Further, by checking, on the virtual NIC 114, a tag corresponding to transmission data at the time of data transmission, the falsification detection unit 112 detects falsification to the transmission data, specifies falsification contents, and specifies a C&C server having specified the falsification contents. At the time of data propagation, when communication data is passed on to an API that performs an encrypting process or a decoding process as reception data or transmission data, it is possible to perform a process of forcibly propagating a tag also to a return value of the API. At this time, IDs can be allocated once again.

With reference to FIG. 4, information stored in the communication-destination information DB 113 is described here. FIG. 4 is a diagram illustrating an example of information stored in the communication-destination information DB 113 according to the present embodiment. As illustrated in FIG. 4, the communication-destination information DB 113 associates attribute information included in a tag, transmission and reception information, and communication destination information to each other and stores therein the associated pieces of information. The transmission and reception information is information indicating whether communication with a communication destination is reception or transmission, and for example, "R" represents reception and "S" represents transmission. In FIG. 4, a case where an IP address is stored as the communication destination information is exemplified.

In the example illustrated in FIG. 4, the communication-destination information DB 113 associates attribute information "0x1", transmission and reception information "R", and communication destination information "192.168.0.1" to each other and stores therein the associated pieces of information. This means that the attribute information given to the reception data from the IP address "192.168.0.1" is "0x1". Further, the communication-destination DB 113 associates attribute information "0xA", transmission and reception information "R", and communication destination information "192.168.1.10" to each other and stores therein the associated pieces of information. This means that the attribute information given to the reception data to the IP address "192.168.1.10" is "0xA".

As indicated in the third row in FIG. 4, the communication-destination information DB 113 associates attribute information "0x3", transmission and reception information "S", and communication destination information "192.168.0.1" to each other and stores therein the associated pieces of information. This means that, even when the IP address in the third row is the same as the IP address "192.168.0.1" in the first row, if the transmission and reception information in the third row is "S (transmission)", which is different from "R (reception)" in the first row, the attribute information "0x3", which is different from that in the first row, is given. That is, in the communication-destination information DB 113, the attribute information is set uniquely with respect to a combination between the transmission and reception information and communication destination information. The communication-destination information DB 113 does not necessarily have to store therein the transmission and reception information. In this case, the attribute information is not limited to the direction of transmission and reception, and is stored for each of communication destinations. Further, the attribute information can be variable-length data or fixed-length data.

As described above, the communication-destination information DB 113 associates attribute information and communication destination information and stores therein the associated pieces of information, because detection of falsification on communication data can be realized due to this configuration. For example, the falsification detection unit 112 refers to the communication-destination information DB 113 and acquires attribute information corresponding to the transmission destination or the transmission source of communication data as a processing target. Subsequently, the falsification detection unit 112 refers to attribute information included in the communication data and collates the referred attribute information with the acquired attribute information. When any falsification is not made, all attribute information included in the communication data is supposed to match the attribute information acquired from the communication-destination information DB 113. On the other hand, if these pieces of information do not match each other, the falsification detection unit 112 can detect falsification. Further, if a communication destination different from an original communication destination is linked, the falsification detection unit 112 can specify the communication destination as a C&C server.

[Process Performed by Detection Device]

Figure 5:
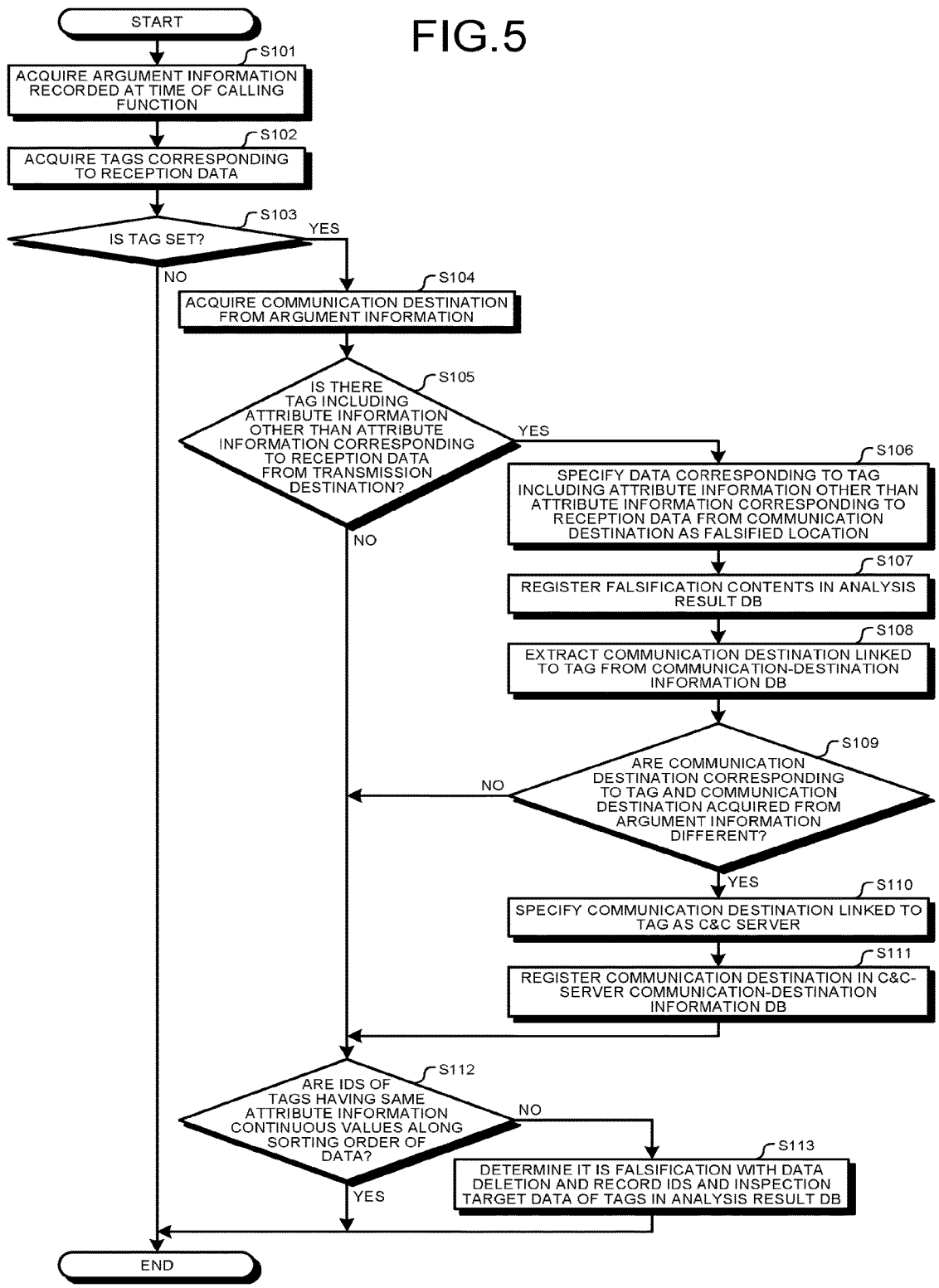
FIG. 5 is a flowchart illustrating a flow of a process with respect to reception data in a falsification detection unit according to the embodiment.
Figure 6:
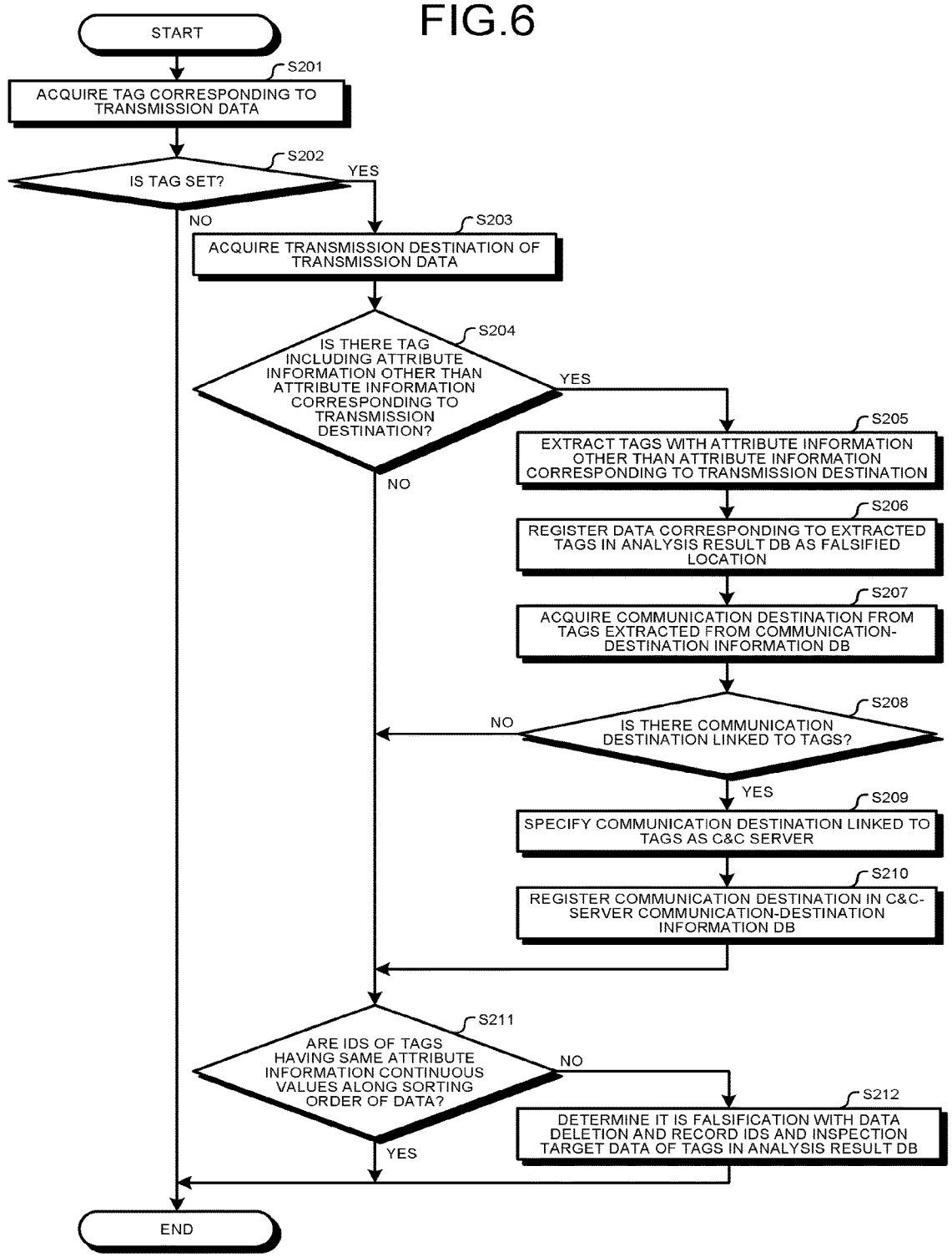
FIG. 6 is a flowchart illustrating a flow of a process with respect to transmission data in the falsification detection unit according to the embodiment.

Next, with reference to FIGS. 5 and 6, a process flow in the detection device 10 is described. FIG. 5 is a flowchart illustrating a flow of a process with respect to reception data in the falsification detection unit according to the present embodiment. FIG. 6 is a flowchart illustrating a flow of a process with respect to transmission data in the falsification detection unit according to the present embodiment.

First, with reference to FIG. 5, processes related to detection of falsification on reception data, specification of falsification contents, and specification of a C&C server having specified the falsification contents in the falsification detection unit 112 are described.

As illustrated in FIG. 5, the falsification detection unit 112 first acquires argument information and a return value recorded in the command monitoring unit 111 at the time of calling an API related to data reception (Step S101), and acquires tags corresponding to respective pieces of reception data (Step S102). Subsequently, if a tag is set on the reception data (YES at Step S103), the falsification detection unit 112 starts a detection process of a falsifying attack. On the other hand, if any tag is not set on the reception data (NO at Step S103), the process with respect to the reception data is finished.

As the detection process of a falsifying attack, the falsification detection unit 112 first acquires a communication destination from the argument information (Step S104). Subsequently, as for a tag corresponding to the reception data, the falsification detection unit 112 checks whether there is any attribute information other than attribute information corresponding to the transmission source of the reception data (Step S105). In this process, when there is a tag including attribute information other than attribute information corresponding to the transmission source of the reception data (YES at Step S105), the falsification detection unit 112 determines that a falsifying attack has been conducted, and performs a process of specifying the location at which the falsifying attack has been conducted (Step S106). In this case, the falsification detection unit 112 determines that data having the tag other than attribute information corresponding to the reception data from the communication destination has been falsified, and registers falsification contents in the analysis result DB 12 (Step S107). Thereafter, the falsification detection unit 112 extracts, from the communication-destination information DB 113, a communication destination linked to the data after being falsified (Step S108). When there is a tag having been acquired from a communication destination different from a communication destination acquired from the argument information (YES at Step S109), the falsification detection unit 112 specifies a communication destination linked to the tag as a C&C server (Step S110), and registers the specified communication destination in the C&C-server communication-destination information DB 13 (Step S111).

Subsequently, the falsification detection unit 112 checks whether IDs of tags having the same attribute information are continuous values along the sorting order of data (Step S112). This process is performed because, as the IDs of tags are allocated as serial numbers, if the order of the serial numbers is misaligned in the middle, it is determined that a falsifying attack with data deletion has been conducted. In this case, when the values are not continuous (NO at Step S112), the falsification detection unit 112 determines that a falsifying attack with data deletion has been conducted, records the IDs and reception data (inspection target data) of the tags in the analysis result DB 12 (Step S113), and finishes the process.

When there is not any tag having attribute information other than attribute information corresponding to the transmission source of the reception data (NO at Step S105), and when there is not any tag acquired from a communication destination different from a communication destination acquired from the argument information (NO at Step S109), the falsification detection unit 112 proceeds to the process at Step S112. Further, when the IDs of tags having the same attribute information are continuous values along the sorting order of data (YES at Step S112), the falsification detection unit 112 finishes the process with respect to the reception data.

Next, with reference to FIG. 6, processes related to detection of falsification on transmission data, specification of falsification contents, and specification of a C&C server having specified the falsification contents in the falsification detection unit 112 are described. These processes are performed on transmission data having reached the virtual NIC 114.

As illustrated in FIG. 6, the falsification detection unit 112 acquires a tag corresponding to transmission data (Step S201), and when there is such tag (YES at Step S202), the falsification detection unit 112 starts a detection process of a falsifying attack. On the other hand, when there is not any tag in the transmission data (NO at Step S202), the falsification detection unit 112 finishes the process with respect to the transmission data.

As the detection process of a falsifying attack, the falsification detection unit 112 first acquires a transmission destination of transmission data from header information included in the transmission data (Step S203). Subsequently, the falsification detection unit 112 checks whether there is any tag including attribute information other than attribute information corresponding to the transmission destination in the transmission data (Step S204). In this process, when there is a tag including attribute information other than attribute information corresponding to the transmission destination in the transmission data (YES at Step S204), the falsification detection unit 112 determines that a falsifying attack has been conducted and extracts tags including attribute information other than attribute information corresponding to the transmission destination (Step S205). Subsequently, the falsification detection unit 112 registers, as a falsified location, the data corresponding to the extracted tags in the analysis result DB 12 (Step S206). Thereafter, the falsification detection unit 112 acquires a communication destination from the tags extracted from the communication-destination information DB 113 (Step S207), and when a communication destination is linked to the tags (YES at Step S208), the falsification detection unit 112 specifies the communication destination linked to the tags as a C&C server (Step S209). The falsification detection unit 112 then registers the specified communication destination in the C&C-server communication-destination information DB 13 (Step S210).

Subsequently, the falsification detection unit 112 checks whether IDs of tags having the same attribute information are continuous values along the sorting order of data (Step S211). This process is performed because, as the IDs of tags are allocated as serial numbers, if the order of serial numbers is misaligned in the middle, it is determined that a falsifying attack with data deletion has been conducted. In this case, when the values are not continuous (NO at Step S211), the falsification detection unit 112 determines that a falsifying attack with data deletion has been conducted, records the IDs and transmission data (inspection target data) of the tags in the analysis result DB 12 (Step S212), and finishes the process.

When there is not any tag including attribute information other than attribute information corresponding to the transmission destination (NO at Step S204), and when any transmission destination is not linked to the tags (NO at Step S208), the falsification detection unit 112 proceeds to the process at Step S211. Further, when the IDs of tags having the same attribute information are continuous values along the sorting order of data (YES at Step S211), the falsification detection unit 112 finishes the process with respect to the transmission data.

Effect of Embodiment

As described above, the detection device 10 gives communication data a tag including attribute information associated with communication destination information of the communication data, and tracks propagation of the communication data on which the tag is given. When, in the communication data, there is a tag including attribute information different from attribute information corresponding to the transmission destination or the transmission source of the communication data, the detection device 10 detects falsification on the communication data. Due to this configuration, the detection device 10 can specifically analyze falsification on the communication data.

For example, in conventional analysis methods, although detection of falsification and specification of falsification contents are performed, there has been a problem that a C&C server having instructed the falsification contents cannot be specified. In order to specify a C&C server, there has been required a mechanism that can analyze the origin of data embedded at the time of falsification, upon performing detection of the falsification and specification of the falsification contents. In this connection, in the present embodiment, propagation of data is tracked in an analysis system in order to detect, by applying a taint analysis, a fact that data that is not originally supposed to exist is included in the data flowing between two specific points. Due to this configuration, the present embodiment realizes not only detection of falsification and specification of falsification contents but also specification of a C&C server having instructed the falsification contents.

Other Embodiments

In the embodiment described above, while a case where the detection device is applied for analysis in a malware execution environment has been described, the present invention is not limited thereto. For example, respective elements according to the present embodiment can be introduced in a user terminal. Further, when the present embodiment is used, it is possible to perform only a detection process of a falsifying attack for a sole purpose of determining whether there is malware having a falsification function or of issuing a warning indicating occurrence of a falsifying attack, without performing any C&C-server specifying process. When a C&C-server specifying process is performed, based on the contents stored in the C&C-server communication-destination information DB 13, disconnection of communication can be made on a VMM (Virtual Machine Monitor) side, or disconnection of communication can be made in association with an external IPS (Intrusion Prevention System) device and the like. The C&C server is also referred to as "command server".

[System Configuration or the Like]

Respective constituent elements in the respective devices illustrated in the drawings are functionally conceptual elements, and do not necessarily have to be physically configured as illustrated in the drawings. That is, specific modes of distribution and integration of the respective devices are not limited to those illustrated in the drawings, and it is possible to configure these devices such that, depending on various types of loads or use statuses, a part or all of these devices are functionally or physically distributed or integrated at an arbitrary unit. Further, a part or all of respective processing functions executed in the respective devices can be realized by a CPU or a program analyzed and executed by the CPU, or can be realized as hardware based on a wired logic.

Furthermore, among respective processes described in the present embodiment, a part or all of the processes described as processes to be performed automatically can be performed manually, or a part or all of the processes described as processes to be performed manually can be performed automatically with a known method. In addition, information including process procedures, control procedures, specific names, and various kinds of data and parameters described in the present specification and the drawings can be arbitrarily changed unless otherwise specified.

[Program]

In the processes performed by the detection device 10 described in the above embodiment, a program described in a computer executable language can be created. For example, in the processes performed by the detection device 10 according to the present embodiment, a detection program described in a computer executable language can be created. In this case, by causing a computer to execute the detection program, effects identical to those described in the above embodiment can be obtained. Further, processes identical to those described in the above embodiment can be realized by recording the detection program in a computer readable recording medium and causing the computer to read and execute the detection program recorded in the recording medium. An example of a computer that executes a detection program for realizing functions identical to those of the detection device 10 illustrated in FIG. 1 is described below.

Figure 7:
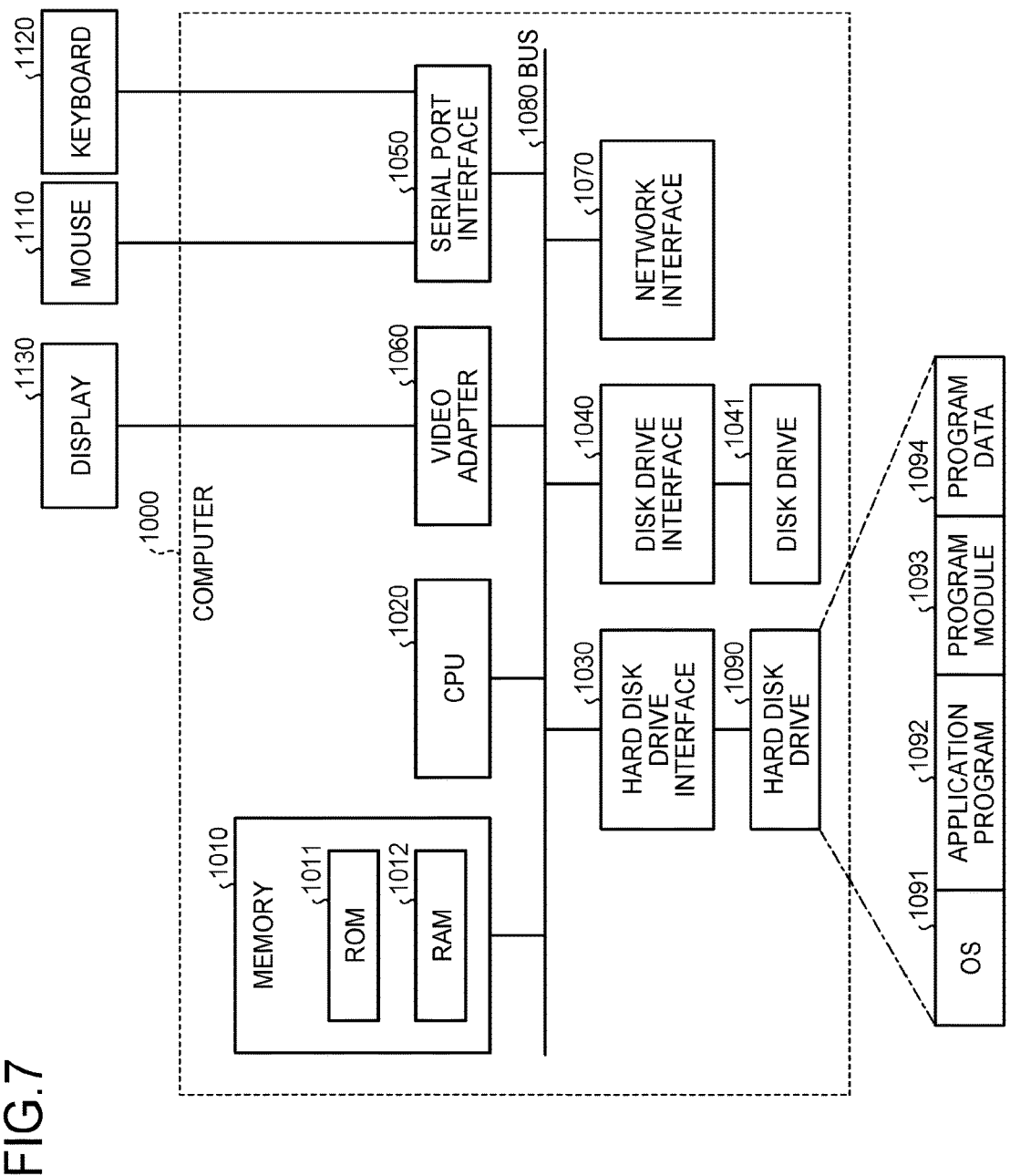
FIG. 7 is a diagram illustrating a computer that executes a detection program.

FIG. 7 is a diagram illustrating a computer 1000 that executes a detection program. As exemplified in FIG. 7, the computer 1000 includes, for example, a memory 1010, a CPU 1020, a hard disk drive interface 1030, a disk drive interface 1040, a serial port interface 1050, a video adapter 1060, and a network interface 1070, and these elements are connected to one another by a bus 1080.

As exemplified in FIG. 7, the memory 1010 includes a ROM (Read Only Memory) 1011 and a RAM (Random Access Memory) 1012. The ROM 1011 stores therein, for example, a boot program such as a BIOS (Basic Input Output System). As exemplified in FIG. 7, the hard disk drive interface 1030 is connected to a hard disk drive 1090. As exemplified in FIG. 7, the disk drive interface 1040 is connected to a disk drive 1041. For example, a detachable storage medium such as a magnetic disk or an optical disk is inserted in the disk drive. As exemplified in FIG. 7, the serial port interface 1050 is connected to a mouse 1110 and a keyboard 1120, for example. As exemplified in FIG. 7, the video adapter 1060 is connected to a display 1130, for example.

As illustrated in FIG. 7, the hard disk drive 1090 includes, for example, an OS 1091, an application program 1092, a program module 1093, and program data 1094. That is, the detection program described above is stored in, for example, the hard disk drive 1090, as a program module in which a command executed by the computer 1000 is described.

Furthermore, the various types of data described in the above embodiment are stored in, for example, the memory 1010 or the hard disk drive 1090, as program data. The CPU 1020 reads the program module 1093 and the program data 1094 stored in the memory 1010 or in the hard disk drive 1090 to the RAM 1012 and executes them as necessary.

The program module 1093 or the program data 1094 in the detection program is not limited to a module or data stored in the hard disk drive 1090, and for example, the program module 1093 or the program data 1094 can be stored in a detachable storage medium and read by the CPU 1020 via a disk drive and the like. Alternatively, it is possible that the program module 1093 or the program data 1094 in the detection program is stored in another computer connected via a network (such as a LAN (Local Area Network) or a WAN (Wide Area Network)) and read by the CPU 1020 via the network interface 1070.

REFERENCE SIGNS LIST 10 detection device
11 malware-execution environment unit
11A malware
11B, 11C process
11D guest OS
11E virtual calculator
110 data-propagation tracking unit
110A disk-tag storage area
110B tag giving unit
110C tag propagation unit A
110D memory-tag storage area
110E tag propagation unit B
110F resistor-tag storage area
111 command monitoring unit
112 falsification detection unit
113 communication-destination information DB
114 virtual NIC
115 virtual disk
116 virtual HW controller
117 virtual memory
118 virtual CPU
118B virtual resistor
12 analysis result DB
13 C&C-server communication-destination information DB

The invention claimed is:

1. A detection device comprising:
processing circuitry configured to
set communication data with a tag including attribute information associated with communication destination information representing address information on destination or source of the communication data, store the attribute information and the communication destination information in a memory, and track propagation of the communication data, on which the tag is given, only within the detection device itself, wherein when the communication data is reception data, the tag is set to the communication data at a timing after the communication data is received at a network interface card (NIC) of the detection device, and when the communication data is transmission data, the tag is set at a timing of calling an API (Application Programming Interface) or a system call for an application to transmit the communication data; and
read the attribute information corresponding to the destination or source of the communication data from the memory in receiving or transmitting the communication data, detect falsification on the communication data, from malware that resides within the detection device and executes one or more processes within the detection device, when the read attribute information is different from the attribute information included in the tag given to the communication data, and in response to the detection of the falsification, specify a communication destination linked to the tag including the different attribute information as a command and control (C&C) server, wherein when the communication data is reception data, the attribute information is read when calling of an API (Application Programming Interface) or a system call is detected from an application by the processing circuitry, and when the communication data is transmission data, the attribute information is read at a timing when the transmission data is copied on the NIC of the detection device, wherein the processing circuitry is configured to track the propagation of the communication data based on storing tags corresponding to data on a virtual disk, a virtual memory, and a virtual resistor of the detection device.

2. The detection device according to claim 1, wherein when the falsification is detected, the processing circuitry specifies data corresponding to a tag including the different attribute information as falsification contents.

3. The detection device according to claim 1, wherein the processing circuitry gives the communication data a plurality of tags in a unit of a predetermined data length and allocates a serial number identification (ID) to each of the plurality of tags along a sorting order of the tags, and when, as for tags given to communication data, IDs respectively allocated to a series of tags including same attribute information are not along the sorting order, the processing circuitry detects the falsification.

4. A detection method executed by a detection device, the method comprising:

setting, by processing circuitry of the detection device, communication data with a tag including attribute information associated with communication destination information representing address information on destination or source of the communication data;

storing the attribute information and the communication destination information in a memory, tracking, by the processing circuitry, propagation of the communication data, on which the tag is given, only within the detection device itself, wherein when the communication data is reception data, the tag is set to the communication data at a timing after the communication data is received at a network interface card (NIC) of the detection device, and when the communication data is transmission data, the tag is set at a timing of calling an API (Application Programming Interface) or a system call for an application to transmit the communication data; and reading, by the processing circuitry, the attribute information corresponding to the destination or source of the communication data from the memory in receiving or transmitting the communication data;

detecting, by the processing circuitry, falsification on the communication data, from malware that resides within the detection device and executes one or more processes within the detection device, when the read attribute information is different from the attribute information included in the tag given to the communication data, and in response to the detection of the falsification; and specifying, by the processing circuitry, a communication destination linked to the tag including the different attribute information as a command and control (C&C) server, wherein when the communication data is reception data, the attribute information is read when calling of an API (Application Programming Interface) or a system call is detected from an application by the processing circuitry, and when the communication data is transmission data, the attribute information is read at a timing when the transmission data is copied on the NIC of the detection device, wherein the processing circuitry performs tracking of the propagation of the communication data based on storing tags corresponding to data on a virtual disk, a virtual memory, and a virtual resistor of the detection device.

5. A non-transitory computer-readable recording medium having stored thereon a detection program causing a detection device to execute a process comprising:

setting, by processing circuitry of the detection device, communication data with a tag including attribute information associated with communication destination information representing address information on destination or source of the communication data;

storing the attribute information and the communication destination information in a memory, tracking, by the processing circuitry, propagation of the communication data, on which the tag is given, only within the detection device itself, wherein when the communication data is reception data, the tag is set to the communication data at a timing after the communication data is received at a network interface card (NIC) of the detection device, and when the communication data is transmission data, the tag is set at a timing of calling an API (Application Programming Interface) or a system call for an application to transmit the communication data; and reading, by the processing circuitry, the attribute information corresponding to the destination or source of the communication data from the memory in receiving or transmitting the communication data;

detecting, by the processing circuitry, falsification on the communication data, from malware that resides within the detection device and executes one or more processes within the detection device, when the read attribute information is different from the attribute information included in the tag given to the communication data, and in response to the detection of the falsification; and specifying, by the processing circuitry, a communication destination linked to the tag including the different attribute information as a command and control (C&C) server, wherein when the communication data is reception data, the attribute information is read when calling of an API (Application Programming Interface) or a system call is detected from an application by the processing circuitry, and when the communication data is transmission data, the attribute information is read at a timing when the transmission data is copied on the NIC of the detection device, wherein the processing circuitry performs tracking of the propagation of the communication data based on storing tags corresponding to data on a virtual disk, a virtual memory, and a virtual resistor of the detection device.

* * * * *